US010204593B2

(12) United States Patent
Lee et al.

(10) Patent No.: US 10,204,593 B2
(45) Date of Patent: Feb. 12, 2019

(54) DISPLAY APPARATUS AND METHOD FOR CONTROLLING THE SAME

(71) Applicant: SAMSUNG ELECTRONICS CO., LTD., Suwon-si (KR)

(72) Inventors: Min-woo Lee, Hwaseong-si (KR); Won-hee Choe, Seoul (KR); Seung-hwan Cho, Yongin-si (KR); Jae-hun Cho, Suwon-si (KR); Jae-won Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 15/097,448

(22) Filed: Apr. 13, 2016

(65) Prior Publication Data

US 2016/0314762 A1 Oct. 27, 2016

Related U.S. Application Data

(60) Provisional application No. 62/150,732, filed on Apr. 21, 2015.

(30) Foreign Application Priority Data

Jul. 8, 2015 (KR) ........................ 10-2015-0097322

(51) Int. Cl.
*G06T 11/60* (2006.01)
*G09G 5/10* (2006.01)
(Continued)

(52) U.S. Cl.
CPC ................ *G09G 5/10* (2013.01); *G06T 11/60* (2013.01); *G09G 3/001* (2013.01); *G09G 5/37* (2013.01);
(Continued)

(58) Field of Classification Search
CPC ............ G06T 11/60; G09G 2320/0271; G09G 2320/0626; G09G 2320/0686;
(Continued)

(56) References Cited

U.S. PATENT DOCUMENTS 6,885,408 B2 * 4/2005 Hirano .............. H04N 5/44504 348/563
7,567,245 B2 7/2009 Mamata
(Continued)

FOREIGN PATENT DOCUMENTS

JP 2004-96593 A 3/2004
JP 2010-26028 A 2/2010
(Continued)

OTHER PUBLICATIONS

International Search Report dated Jul. 28, 2016 issued by International Searching Authority in counterpart International Application No. PCT/KR2016/003960 (PCT/ISA/210).
(Continued)

*Primary Examiner* — Sing-Wai Wu
(74) *Attorney, Agent, or Firm* — Sughrue Mion, PLLC

(57) ABSTRACT

A display apparatus includes a display configured to display content, a sensor configured to sense ambient light, and a processor configured to, in response to the ambient light satisfying a predetermined condition, divide the screen into at least a first area and a second area based on an attribute of the content and individually control a first output luminance of the first area and a second output luminance of the second area.

18 Claims, 30 Drawing Sheets

(51) Int. Cl.
*G09G 5/37* (2006.01)
*G09G 3/00* (2006.01)

(52) U.S. Cl.
CPC ............... *G09G 2320/0271* (2013.01); *G09G 2320/0626* (2013.01); *G09G 2320/0686* (2013.01); *G09G 2330/021* (2013.01); *G09G 2360/144* (2013.01)

(58) Field of Classification Search
CPC ....... G09G 2330/021; G09G 2360/144; G09G 3/001; G09G 5/10; G09G 5/37
See application file for complete search history.

(56) References Cited

U.S. PATENT DOCUMENTS

2006/0044459 A1* 3/2006 Kato .................... H04N 5/2351 348/362
2010/0013866 A1 1/2010 Okabe
2010/0073276 A1 3/2010 Koike et al.
2013/0335461 A1 12/2013 Rekimoto
2014/0153056 A1* 6/2014 Takagi .................. G06F 15/025 358/3.09
2014/0285531 A1 9/2014 Dasher
2015/0070376 A1 3/2015 Fujine et al.
2015/0235587 A1* 8/2015 Su ........................ G09G 3/2003 345/694

FOREIGN PATENT DOCUMENTS

KR 10-0651385 B1 11/2006
KR 10-2010-0043418 A 4/2010
KR 10-2016-0080746 A 7/2016

OTHER PUBLICATIONS

Written Opinion dated Jul. 28, 2016 issued by International Searching Authority in counterpart International Application No. PCT/KR2016/003960 (PCT/ISA/237).

* cited by examiner

DISPLAY APPARATUS AND METHOD FOR CONTROLLING THE SAME

CROSS-REFERENCE TO RELATED APPLICATIONS

This application claims priority under 35 U.S.C. § 119 from Korean Patent Application No. 10-2015-0097322, filed on Jul. 8, 2015 in the Korean Intellectual Property Office, and claims the benefit of U.S. Provisional Application No. 62/150,732, filed on Apr. 21, 2015 in the United States Patent and Trademark Office, the disclosures of which are incorporated herein by reference in their entireties.

BACKGROUND

1. Field

Methods and apparatuses consistent with exemplary embodiments relate to a display apparatus and a method for controlling the same, and more particularly, to a display apparatus which supports a function of sensing ambient illuminance and a method for controlling the same.

2. Description of Related Art

With the development of electronic technologies, various types of electronic apparatuses have been developed and come into wide use. Specifically, mobile apparatuses and display apparatuses, such as a television (TV), which have been commonly used in recent years, have been developing rapidly over the last few years.

In addition, as use of smart phones and tablet devices spread, usage time of these mobile display apparatuses increases, thereby increasing visual fatigue.

Specifically, the usage time of the mobile display apparatuses at night and/or in low-light environments is increasing. In such low-light environments, when a screen of the mobile display apparatus in a power-saving mode (or OFF state) is abruptly illuminated, a user may be adversely affected by glare or visual fatigue due to an abrupt change of luminance.

A method for adjusting luminance of a display according to ambient illuminance has been used, but an adjustment operation of the method is performed by uniformly controlling luminance of entire display screen, as illustrated in FIG. 19. Thus, the method is ineffective in this regard.

SUMMARY

Exemplary embodiments may address the aforementioned and/or other problems and disadvantages occurring in the related art. Also, exemplary embodiments are not required to overcome the disadvantages described above, and an exemplary embodiment may not overcome any of the problems described above.

According to an aspect of an exemplary embodiment, a display apparatus includes: a display configured to display content; a sensor configured to sense ambient light; and a processor configured to, in response to the ambient light satisfying a predetermined condition, divide the display content into at least a first area and a second area based on an attribute of the content and individually control a first output luminance of the first area and a second output luminance of the second area.

The first output luminance may be different than the second output luminance.

The processor may be further configured to individually control the first output luminance to reach a first target luminance value before the second output luminance area reaches a second target luminance value.

The processor may be further configured to divide the display content into the first area and the second area in response to at least one among the ambient light satisfying the predetermined condition, an event in which the ambient light changes rapidly by an amount greater than a predetermined critical value, an event in which the display is converted from a dark screen to a bright screen while the ambient light is lower than a certain illuminance, and an event in which a state of the display is converted from an inactive state to an active state while the ambient light is lower than the certain illuminance.

The first area may correspond to an interested area and the second area may correspond to an uninterested area, and the first area and the second area may be determined based on the attribute of the content.

The processor may be further configured to, in response to a state of the display being converted from an inactive state to an active state and the ambient light being lower than a predetermined critical illuminance, control the first output luminance to reach a first target luminance value before the second output luminance reaches a second target luminance value.

The processor may be further configured to, in response to the ambient light being lower than a predetermined critical luminance, control the second output luminance to be lower than the first output luminance.

The processor may be further configured to, in response to the ambient light being higher than a predetermined critical luminance, control the first output luminance to be lower than the second output luminance.

The first area may be on a first display layer and the second area may be on a second display layer, and the processor may be further configured to control the first output luminance to reach a first target luminance value before the second output luminance reaches a second target luminance value.

The processor may be further configured to determine the first area by determining a gradation section corresponding to a predetermined gradation condition.

The processor may be further configured to, in response to the attribute of the content indicating high contrast, reduce the first output luminance, and the predetermined gradation condition may include a gradation higher than a predetermined critical value.

According to an aspect of another exemplary embodiment, a method for controlling a display apparatus includes: determining whether ambient light satisfies a predetermined condition; dividing, in response to the ambient light satisfying the predetermined condition, display content into at least a first area and a second area based on an attribute of the display content; individually controlling a first output luminance of the first area and a second output luminance of the second area; and displaying the first area at the first output luminance and the second area at the second output luminance.

The individually controlling may include individually controlling the first output luminance to be different from the second output luminance.

The individually controlling may include controlling the first output luminance to reach a first target luminance value before the second output luminance reaches a second target luminance value.

The dividing may be performed in response to at least one among the ambient light satisfying the predetermined condition, an event in which the ambient light changes rapidly by an amount greater than a predetermined critical value, an event in which the display is converted from a dark screen to a bright screen while the ambient light is lower than a certain illuminance, and an event in which a state of the display apparatus is converted from an inactive state to an active state while the ambient light is lower than the certain illuminance.

The first area may correspond to an interested area and the second area may correspond to an uninterested area, and the first area and the second area may be determined based on the attribute of the content.

The individually controlling may include, in response to the display being converted from an inactive state to an active state and the ambient light being lower than a predetermined critical illuminance, controlling the first output luminance to reach a first target luminance value before the second output luminance reaches a second target luminance value.

The individually controlling may include, in response to the ambient light being lower than a predetermined critical luminance, controlling a second output luminance of the second area to be lower than a first output luminance of the first area.

The individually controlling may include, in response to the ambient light being higher than a predetermined critical luminance, controlling the first output luminance to be lower than the second output luminance.

The first area may be on a first display layer and the second area may be on a second display layer, and the individually controlling may include individually controlling the first output luminance to reach a first target luminance value before the second output luminance reaches a second target luminance value.

The predetermined condition may correspond to a predetermined gradation condition, and the first area may satisfy the predetermined condition.

The individually controlling may include reducing the first output luminance in response to the attribute of the content indicating high contrast, and the predetermined gradation condition may include a gradation higher than a predetermined critical value.

According to an aspect of yet another exemplary embodiment, a method of displaying content includes: analyzing display content to determine a first area of the display content having a first initial luminance and a second area of the display content having a second initial luminance; sensing an ambient light level; comparing the sensed ambient light level to a threshold ambient light level; modifying the first illuminance and the second illuminance based on the comparing; and displaying the display content with the modified first illuminance and the second modified illuminance.

In response to the sensed ambient light level being less than the threshold ambient light level, the first modified illuminance may be greater than the first illuminance.

The second modified illuminance may be less than the second illuminance.

In response to the sensed ambient light level being greater than the threshold ambient light level, the first modified illuminance may be less than the first illuminance.

BRIEF DESCRIPTION OF THE DRAWINGS

The above and/or other aspects will become more apparent by describing exemplary embodiments with reference to the accompanying drawings, in which.

DETAILED DESCRIPTION

Figure 1A:
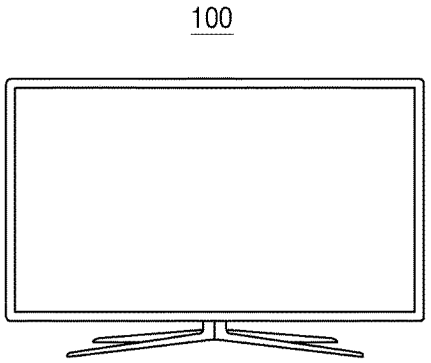
FIGS. 1A-1E are views illustrating various display apparatuses according to exemplary embodiments.
Figure 1B:
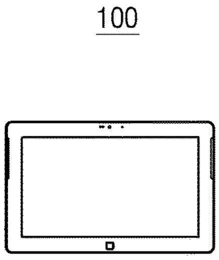
Figure 1C:
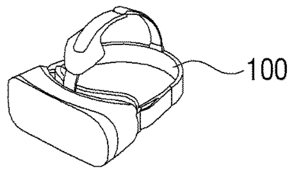
Figure 1D:
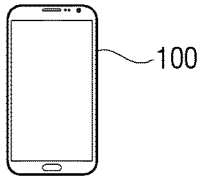
Figure 1E:
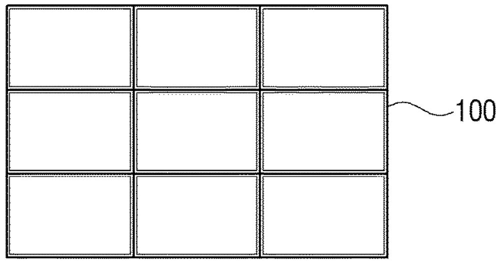

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of exemplary embodiments. However, it is apparent that exemplary embodiments can be practiced without those specifically defined matters. Also, well-known functions or constructions may not described in detail since they would obscure the application with unnecessary detail.

FIGS. 1A-1E illustrate exemplary implementations of a display apparatus according to various exemplary embodiments.

According to an exemplary embodiment, a display apparatus 100 may be realized as a mobile phone, such as a smart phone, but is not limited thereto. That is, the display apparatus 100 may be realized as diverse apparatuses having a display function, for example, a tablet Personal Computer (PC), a smart watch, a Portable Multimedia Player (PMP), a Personal Digital Assistant (PDA), a laptop PC, a TV, a Head Mounted Display (HMD), a Near Eye Display (NED), a Large Format Display (LFD), a digital signage, a Digital Information Display (DID), a video wall, a projector display, etc.

In order to provide the display function, the display apparatus 100 may include various types of displays, such as a Liquid Crystal Display (LCD), an Organic Light-Emitting Diode (OLED), Liquid Crystal on Silicon (LCoS), Digital Light Processing (DLP), a Quantum Dot (QD) display panel, etc.

A high-luminance display module may emit a bright light, which may be unpleasant to some people. In general, a person may observe two kinds of glare in a low-light environment.

Figure 2A:
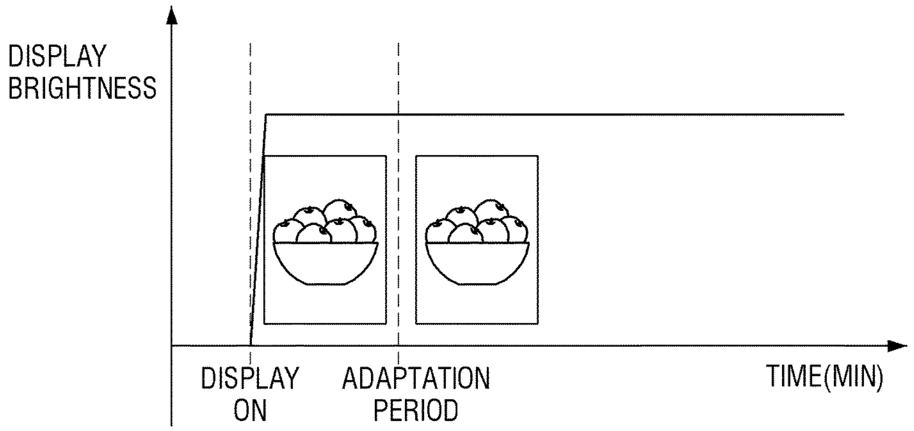
FIGS. 2A and 2B are views illustrating luminance adjustment according to exemplary embodiments.
Figure 2B:
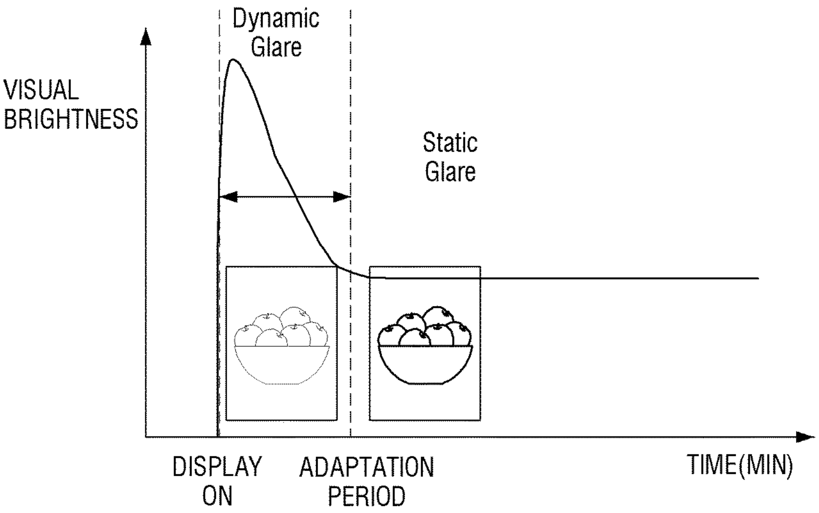

As illustrated in FIG. 2A, when the display apparatus 100 is used in a dark environment, and a display screen in a power-saving mode (or an OFF state or an inactivated state) is abruptly illuminated, a user may observe dynamic glare or experience visual fatigue due to an abrupt change of luminance, as illustrated in FIG. 2B.

Dynamic glare occurs during a luminance adaptation period, and refers to glare according to temporal variation. Dynamic glare occurs due to a difference between a stimulus of a previous light and a stimulus of a present light, which may correspond to the principle where a human recognizes an intensity of a stimulus which exceeds a perceptually expected stimulus value as being greater than its original intensity.

Figure 3A:
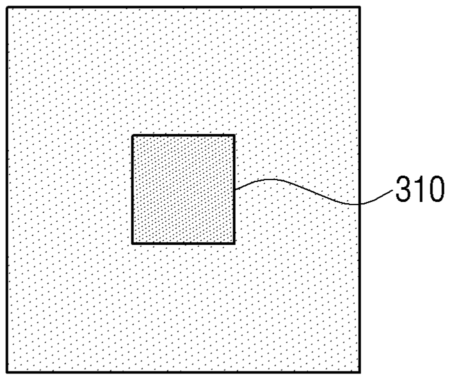
FIGS. 3A-3C are views illustrating luminance adjustment according to exemplary embodiments.
Figure 3B:
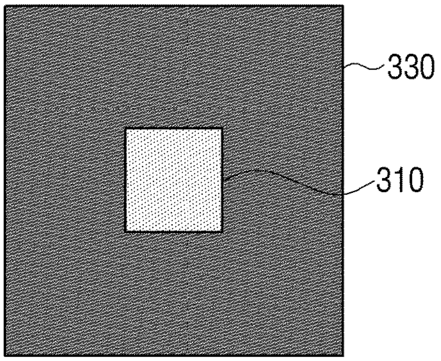
Figure 3C:
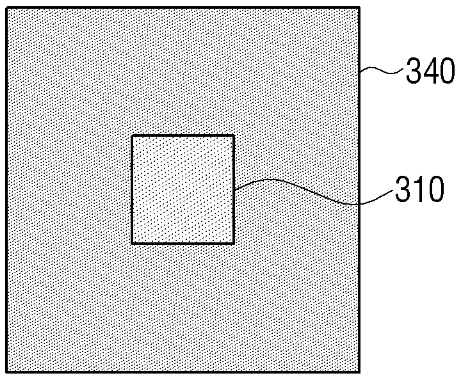

Meanwhile, in FIG. 2B, static glare refers to glare which occurs due to an element of a content. That is, in a display having the same maximum luminance, the static glare is recognized by an element of a content, such as contrast. For example, as illustrated in FIGS. 3A to 3C, an object 310 having the same gradation may be recognized as different brightness from person to person according to gradation of a background area.

Accordingly, the display apparatus 100 according to an exemplary embodiment may adjust brightness of a display in order to reduce various types of glare in a particular environment. Hereinafter, various exemplary embodiments will be described in detail with reference to the accompanying drawings.

Figure 4A:
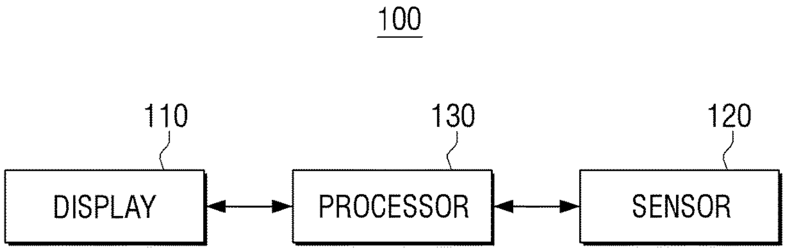
FIG. 4A is a block diagram illustrating a structure of a display apparatus according to an exemplary embodiment.

FIG. 4A is a block diagram illustrating a structure of a display apparatus according to an exemplary embodiment.

Referring to FIG. 4A, a display apparatus 100 includes a display 110, a sensor 120, and a processor 130.

The display 110 may provide various content screens which may be provided through the display apparatus 100. The content screens may include diverse contents, such as an image, a moving image, text, music, an application execution screen including various contents, a Graphic User Interface (GUI) screen, etc.

As described above, the display 110 may be realized as various types of displays, such as an LCD, an OLED, LCoS, DLP, etc. In addition, the display 110 may be made of a transparent material, so as to be realized as a transparent display which displays information.

The display 110 may be realized as a touch screen which forms a mutual layer structure with a touch pad. In this case, the display 110 may display a user interface, be used as a user input device, as well as an output device.

The sensor 120 senses ambient illuminance. In order to perform this operation, the sensor 120 may be realized as an illuminance sensor. In this case, the illuminance sensor may use various photoelectric cells, and may also use a photoelectric tube to measure very low illuminance. For example, a Cadmium-Sulfide (CdS) illuminance sensor may be mounted on the display apparatus 100 in order to sense illuminance in multiple directions. In this case, an illuminance sensor may be mounted in at least one predetermined area on multiple surfaces of the display apparatus 100, or may be mounted in each pixel of both the surfaces. For example, an illuminance sensor in which a Complementary Metal-Oxide Semiconductor (CMOS) sensor is expanded to correspond to a size of the display 110 may be mounted to measure an illuminance state of each area, or each pixel.

For example, a CdS illuminance sensor may sense an ambient light around the display apparatus 100, and an Analog-to-Digital (A/D) converter may convert a voltage obtained generated by the CdS illuminance sensor into a digital value, and transmit the converted digital value to the processor 130.

The processor 130 controls overall operations of the display apparatus 100.

The processor adjusts an output luminance value of the display 110 based on the ambient illuminance sensed by the sensor 120 and a content attribute. In this case, an output luminance value may be adjusted by controlling a digital gradation value or luminance of a display which is mapped onto a digital gradation value constituting each content, as well as physically controlling luminance. However, according to circumstances and information on various ambient environments, for example, a power status of the display apparatus 100, a user status (sleeping, reading a book, etc.), location information, may be considered.

In response to the ambient illuminance satisfying a predetermined condition, the processor 130 may divide a screen into at least a first area and a second area based on an attribute of a content, and individually control an output luminance value of each of the divided areas. For example, the predetermined condition may include a case in which an ambient environment of a display is rapidly dropping from a bright environment to a dark environment below a threshold illuminance (for example, 100 lux), a case in which a screen of a display is changed from a dark screen to a bright screen when illuminance is below a threshold illuminance, a case in which a state of the screen is converted from an inactive state to an active state while the ambient illuminance is lower than a threshold illuminance, etc. In this case, the output luminance value of each area may include at least one of a maximum brightness value of a content, a maximum color value of the content, and an average brightness value of the content.

To be specific, the processor 130 may control the output luminance of each area individually so that luminance of information displayed in the first area is different from luminance of information displayed in the second area. Alternatively, the processor 130 may control the output luminance of each area individually so that the luminance of the information displayed in the first area reaches a target luminance value ahead of the luminance of the information displayed in the second area. In this case, the target luminance value of each area may be the same as or different from each other. The processor 130 may vary a shape of a gamma curve applied to the first area and a shape of a gamma curve applied to the second area. In this case, the gamma curve refers to a table which represents a relation between gradation of an image and luminance of a display. For example, when a log-shaped gamma curve is applied to an interested area and an exponential function-shaped gamma curve is applied to an uninterested area, a human may recognize that the interested area as appearing first, and the uninterested area as gradually appearing.

According to an exemplary embodiment, the processor 130 may divide a screen into an interested area and an uninterested area based on an attribute of a content, and individually control an output luminance value of each of the interested area and the uninterested area.

To be specific, the processor 130 may divide the screen into the interested area and the uninterested area based on various elements of displayed content, that is, various content attributes, for example, color information on at least one of an image and text, brightness information on at least one of an image and text, an arrangement status of objects constituting at least one of an image and text, time information corresponding to a time when a content is displayed, etc. In addition, brightness information on a content may include at least one of luminance of at least one object included in a screen in which a content is displayed, a dimension of the object, and a luminance difference between the object and an adjacent object. In this case, the at least one object may be an object having a maximum luminance value among objects included in the screen, but is not limited thereto. For example, an object having a second highest luminance value may be a criterion for determining a display attribute of a content, as well as the object having the maximum luminance value from among the objects included in the screen.

According to another exemplary embodiment, the processor 130 may divide a screen into an interested area and an uninterested area based on a priority order predefined by a user or by a manufacturer, and individually control an output luminance value of each of the interested area and the uninterested area. For example, in response to the priority order being predetermined for each information type (for example, clock information, date information, notification information, etc.) by a user or by a manufacturer, the processor 130 may divide a screen into an interested area and an uninterested area of a user based on the priority order.

Meanwhile, in response to a state of the screen being converted from an inactive state to an active state and the ambient illuminance being lower than a predetermined critical illuminance, the processor 130 may individually control the output luminance values of the interested area and the uninterested area so that the interested area reaches to a target luminance value ahead of the uninterested area.

According to another exemplary embodiment, in response to a state of the screen being converted from an inactive state to an active state and the ambient illuminance being lower than a predetermined critical illuminance, the processor 130 may individually control the output luminance values of the interested area and the uninterested area so that the luminance of the uninterested area is lower than the luminance of the interested area. In this case, the inactive state may be a state in which the screen is turned off, for example, a screen-off state, a standby state, etc.

According to still another exemplary embodiment, in response to a state of the screen being converted from an inactive state to an active state and the ambient illuminance being lower than a predetermined critical illuminance, the processor 130 may individually control the output luminance of the interested area and the uninterested area so that the luminance of the interested area reaches a target luminance value ahead of the uninterested area, and a target luminance of the interested area is higher than a target luminance of the uninterested area.

According to still another exemplary embodiment, in response to the ambient illuminance being lower than a predetermined critical illuminance, the processor 130 may individually control the output luminance values of the interested area and the uninterested area so that the output luminance of the uninterested area is lower than the output luminance of the interested area, thereby reducing glare, even though an event in which a state of the screen is converted from an inactive state to an active state does not occur.

In addition, in response to the ambient illuminance being higher than a predetermined critical illuminance, the processor 130 may individually control the areas so that the output luminance of the interested area is lower than the output luminance of the uninterested area, thereby increasing visibility of the interested area.

However, an output luminance value of a plurality of pieces of information in the interested area or in the uninterested area may be individually controlled according to a priority order.

In response to the first area and the second area including information that the areas are disposed on different display layers, the processor 130 may individually control output luminance of each of a first display layer having the first area and a second display layer having the second area.

To be specific, the processor 130 may individually control the output luminance of each display layer so that the luminance of the first display layer having the first area is different from the luminance of the second display layer having the second area. Alternatively, the processor 130 may individually control the output luminance of each display layer so that the luminance of the first display layer having the first area reaches a target luminance value before the luminance of the second display layer having the second area. In this case, the target luminance values of the respective display layers may be the same or different. The processor 130 may vary a shape of a gamma curve applied to the first display layer and a shape of a gamma curve applied to the second display layer.

In this case, the processor 130 may determine for each layer, at least one of initial luminance, target luminance, and a time when luminance of a layer reaches the target luminance, based on a priority order of each display layer. The priority order may be determined in advance or in real time.

In response to the first area and the second area being different pixel areas on the same display layer, the processor 130 may individually control the output luminance of the pixel areas. For example, this operation may be applied to a case in which the display 110 is realized as a display panel which causes a plurality of pixels to emit a light to display an image.

The plurality of pixels may be realized as a spontaneous emission element which emits light spontaneously, such as an OLED, a Plasma Display Panel (PDP), a Light-Emitting Diode (LED), etc., but is not limited thereto.

The processor 130 may divide a gradation section of a content into a first gradation section satisfying a predetermine condition and a second gradation section based on an attribute of the content, and individually control output luminance of each of the gradation sections.

To be specific, the processor 130 may convert an input analog image into a digital image (for example, 6-bit or 8-bit) and divide the converted digital image into a plurality of gradation sections based on gradation characteristics of the image. In this case, gradation refers to depth variation of a color, that is, a multi-level subdivision with respect to a bright part and a dark part. Generally, color variation is expressed more naturally as a difference in light, and shade is finely subdivided, resulting in good gradation.

The processor 130 may adjust luminance of a particular gradation section in a gamma curve which represents a relation between gradation of an image and display luminance.

To be specific, in response to high contrast of a content, the processor 130 may control output luminance of a gradation section higher than a predetermined critical value to be reduced. For example, the processor 130 may control output luminance of a gradation section which outputs a white color to be reduced.

The processors 130 may adjust an output luminance value of the display 110 to be increased gradually based on at least one of a predetermined mathematical time function, a brightness value stored in a Look-Up Table (LUT), strength of composing an image to be displayed and an image which is darker than the image to be displayed, and a memory value which is pre-recorded in a Device Driver Integrated Circuit (IC).

The processor 130 may determine output luminance adjusting elements according to an attribute of each divided area based on the ambient illuminance sensed by the sensor 120 and adjust an output luminance value of each area individually based on the determined elements.

To be specific, the processor 130 may determine at least one of an initial luminance value, a target luminance value, and a luminance varying time, according to the attribute of each area based on sensed ambient illuminance, and adjust a luminance value of each area to be increased gradually based on the determined value. At least one of the initial luminance value, the target luminance value, and the luminance varying time may vary depending upon a user setting.

In this case, the processor 130 may gradually increase the output luminance value of the display 110 from the determined initial luminance value to a target luminance value during the determined luminance varying time.

As an example, it is assumed that the display 110 is realized as an LCD panel. In general, an LCD panel operates by manipulating an arrangement of liquid crystal molecules in a liquid crystal material by controlling a voltage difference of an electrode between upper and lower glass panes enclosing the liquid crystal material, thereby controlling an amount of light allowed to pass through, and displaying an image. The LCD panel does not spontaneously emit a light, and thus, a light source is required for a user to recognize displayed content. That is, the LCD panel uses a light source and directs a light of the light source from a rear side of the LCD panel such that the user is able to see an image displayed in a screen.

Accordingly, it may be assumed that divided areas are disposed on different display layers of the LCD panel.

The processor 130 may determine a lamp-supplied voltage control value for controlling a lamp driver based on a value which is predetermined to drive the lamp so as to provide the display layers with a determined initial luminance value and provide a determined target luminance value by gradually increasing the lamp-supplied voltage control value.

For example, the lamp driver may include a voltage control signal generator, a converter, and an inverter. In this case, the voltage control signal generator generates a voltage control signal and transmits the generated voltage control signal to the converter in order to control power supplied from a power supply unit in response to the lamp-supplied voltage control value transmitted from the processor 130. The converter adjusts an output voltage of the power supply unit in response to the lamp-supplied voltage control value in the voltage control signal transmitted from the voltage control signal generator. The inverter converts a direct current (DC) voltage transmitted from the converter into an alternating current (AC) voltage and supplies the AC voltage to the lamp driver. Accordingly, the lamp driver may control the converter according to the value transmitted from the processor 130 and control brightness of the lamp. The method for adjusting luminance may be performed in various manners according to an implementation form of the display 110.

As another example, when the display 110 is realized as an OLED panel which causes a plurality of spontaneous emission elements to emit a light to display an inputted image, the divided areas may be disposed on different display layers as described above. However, the divided areas may be different pixel areas on the same display layer.

The processor 130 may provide a user interface (UI) screen for adjusting an output luminance value of the display in a certain area of the display in response to a predetermined event. Accordingly, the user may adjust the output luminance value of the display manually through the UI screen. In this case, the processor 130 may provide a graphical user interface (GUI) which shows an original luminance value of the content in the UI screen. Accordingly, the user may adjust the output luminance value of the display properly through the GUI.

Figure 4B:
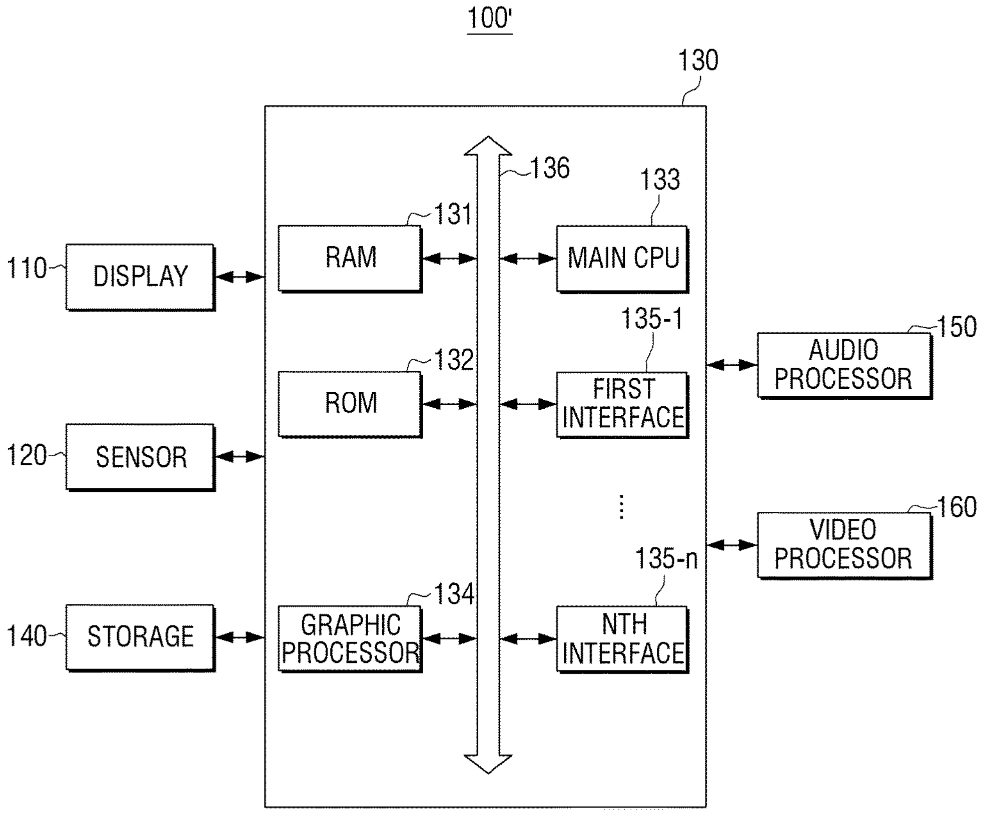
FIG. 4B is a block diagram illustrating a detailed structure of the display apparatus of FIG. 4A according to an exemplary embodiment.

FIG. 4B is a block diagram illustrating a detailed structure of the display apparatus of FIG. 4A.

Referring to FIG. 4B, a display apparatus 100' includes a display 110, a sensor 120, a processor 130, a storage 140, an audio processor 150, and a video processor 160. The detailed descriptions on components which overlap the components of FIG. 4A will be omitted.

The processor 130 includes a random access memory (RAM) 131, a read-only memory (ROM) 132, a main central processing unit (CPU) 133, a graphic processor 134, a first to n interfaces 135-1 to 135-*n*, and a bus 136.

The RAM 131, the ROM 132, the main CPU 133, the graphic processor 134, and the first to nth interfaces 135-1 to 135-*n* may be interconnected through the bus 136.

The first to nth interfaces 135-1 to 135-*n* are connected to the aforementioned various components. One of the interfaces may be a network interface which is used to connect to an external apparatus through a network.

The main CPU 133 accesses the storage 140 and performs a boot-up operation by using an operating system (O/S) stored in the storage 140. In addition, the main CPU 133 performs various operations by using diverse programs, contents, and data stored in the storage 140.

The ROM 132 stores a set of commands for system booting. In response to a turn-on command being received and power being supplied, the main CPU 133 copies the O/S stored in the storage 140 into the RAM 131 according to a command stored in the ROM 132, and boots up a system by executing the O/S. Upon completion of the boot-up operation, the main CPU 133 copies various application programs stored in the storage 140 into the RAM 131 and executes the application programs copied into the RAM 131 to perform various operations.

The graphic processor 134 generates a screen including various objects, such as an icon, an image, text, etc., by using a computing unit and a rendering unit. The computing unit computes attribute values, such as a coordinate value, a shape, a size, and a color of each object to be displayed, according to a layout of the screen based on the received control command. The rendering unit generates a screen with various layouts including objects based on the attribute values computed by the computing unit.

The above-described operations of the processor 130 may be performed by the programs stored in the storage 140.

The storage 140 stores various data including an O/S software module for operating the display apparatus 100, various multimedia contents, etc. Specifically, the storage 140 may store programs, such as an illuminance calculating module, a content attribute determining module, and a luminance adjusting module, luminance information according to illuminance, and a content attribute.

Hereinafter, specific operations of the processor 130 using the programs in the storage 140 will be described in detail.

Figure 5:
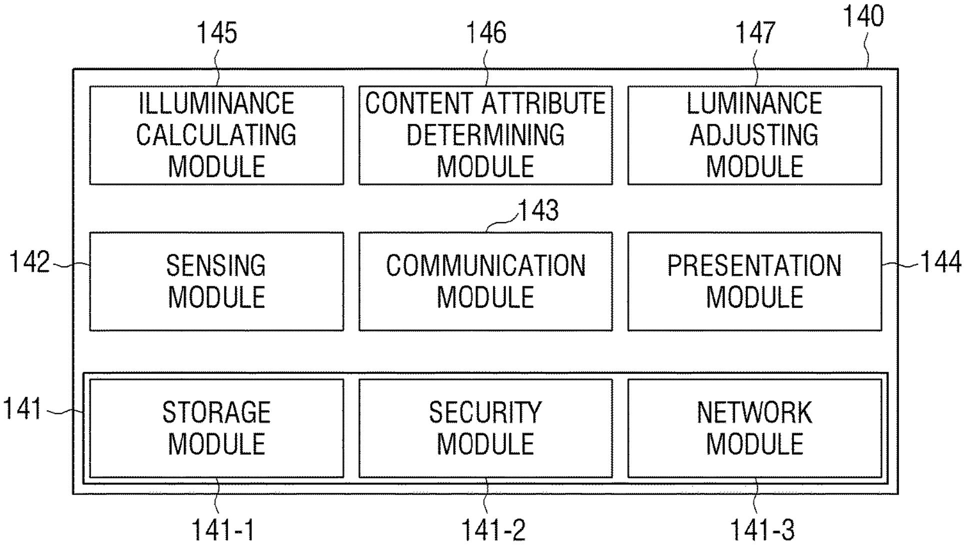
FIG. 5 is a view illustrating diverse modules in a storage according to an exemplary embodiment.

FIG. 5 is a view provided to describe diverse modules in a storage.

Referring to FIG. 5, the storage 140 may include software including a base module 141, a sensing module 142, a communication module 143, a presentation module 144, an illuminance calculating module 145, a content attribute determining module 146, and a luminance adjusting module 147.

The base module 141 refers to a basic module which processes signals transmitted from respective hardware included in the display apparatus 100' and transmits the processed signals to an upper layer module. The base module 141 includes a storage module 141-1 for managing a database (DB) or registry, a security module 141-2 for supporting certification, permission, and secure storage with respect to the hardware, and a network module 141-3 for supporting network connection.

The sensing module 142 collects information from various sensors, and analyzes and manages the collected information. The sensing module 142 may include an illuminance recognizing module, a touch recognizing module, a head direction recognizing module, a face recognizing module, a voice recognizing module, a motion recognizing module, a near field communication (NFC) recognizing module, etc.

The communication module 143 performs communication with an external apparatus. The communication module 143 may include a device module used for communication with an external apparatus, a messaging module including a messenger program, a Short Message Service (SMS) & Multimedia Message Service (MMS) program, and an e-mail program, a call info aggregator program module, and a phone module including a VoIP module.

The presentation module 144 configures a display screen. The presentation module 144 may include a multimedia module for playing back and outputting a multimedia content, and a UI rendering module for performing a UI processing operation and graphic processing operation.

The illuminance calculating module 145 calculates illuminance information according to an illuminance signal generated by the sensor 120. In order to perform this operation, the illuminance calculating module 145 may include a predetermined algorithm for converting the illuminance signal into illuminance information that may be determined by the processor 130.

The content attribute determining module 146 determines an attribute of content displayed in a screen. In order to perform this operation, the content attribute determining module 146 may include an algorithm for obtaining diverse information relating to at least one object included in an image frame. For example, the content attribute determining module 146 may include a predetermined algorithm for determining luminance of at least one object included in a screen in which a content is displayed, a dimension of the object, a luminance difference between the object and an adjacent object, a color of the object, a time when each object is displayed, etc.

The luminance adjusting module 147 adjusts an output luminance value of each divided area based on the attribute of the content determined by the content attribute determining module 146 according to the ambient illuminance calculated by the illuminance calculating module 145. In order to perform this operation, luminance adjusting module 147 may include various data and algorithms for determining a luminance adjusting element suitable for each area. However, in case of particular applications (for example, a call application, an SMS application, etc.), most screens provided by the applications have a similar attribute, and thus, an output luminance value of a display may be adjusted according to a luminance adjusting element which is predetermined for each application.

Other than the above-described modules, the display apparatus 100' may further include audio processor 150 for processing audio data, the video processor 160 for processing video data, a speaker for outputting various audio data processed by the audio processor 150, various notification sounds and voice messages, a microphone for receiving a user voice or other sounds and converting the received user voice or sounds into audio data, etc.

Figure 6:
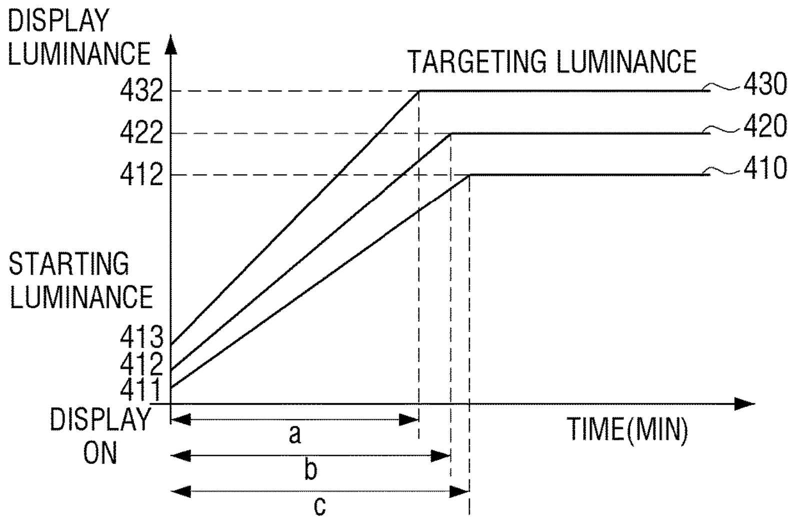
FIG. 6 is a illustrating a method for adjusting luminance of a display according to an exemplary embodiment.

FIG. 6 is a graph illustrating a method for adjusting luminance of a display according to an exemplary embodiment.

Referring to FIG. 6, in response to display areas being divided according to an attribute of a content, at least one of an initial luminance value, a target luminance value, and a luminance varying time may be determined in a variable manner according to various characteristics, such as the ambient illuminance and a display attribute of a corresponding area.

For example, as illustrated in FIG. 6, initial luminance values 411 to 413, target luminance values 421 to 423, and luminance varying times a to c may be variably determined according to the ambient illuminance and the attribute of the corresponding display area (for example, gradation of the display area, a dimension of the display area, an interest rate in an object displayed in the display area, etc.). In addition, graphs 410 to 430 for showing an output luminance value of the display with time may vary according to the determined values, as illustrated. According to an exemplary embodiment, a luminance value varies linearly, but this is only an example. That is, the luminance value may vary in other forms, such as a step form, a wave shape, a second-curved shape, etc.

Figure 7A:
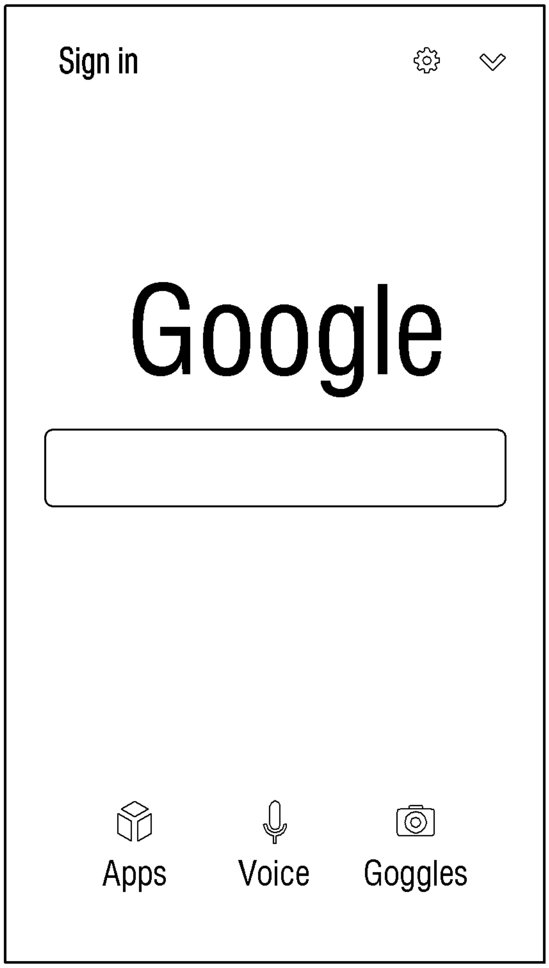
FIGS. 7A and 7B are views illustrating display content according to various exemplary embodiments.
Figure 7B:
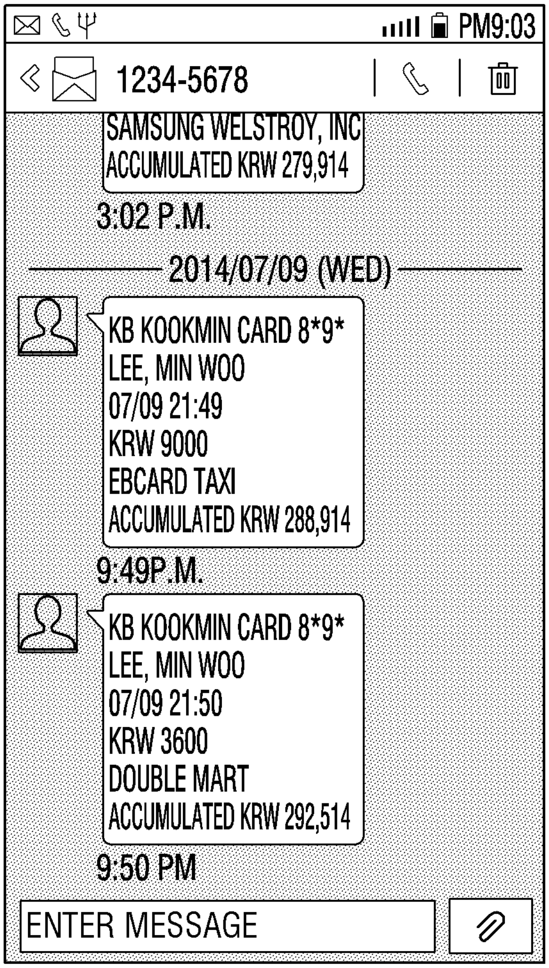

FIGS. 7A and 7B are views provided to illustrate display attributes of a content according to various exemplary embodiments.

According to an exemplary embodiment, an intensity of glare may vary according to a display attribute of a content, even in the same luminance.

For example, compare a content having high brightness over all, as illustrated in FIG. 7A, with a content having a dark background and a bright color with high brightness, as illustrated in FIG. 7B. It is more likely that the glare in a low luminance occurs in the case of FIG. 7B. Accordingly, an initial luminance value of FIG. 7B may be set to be lower than an initial luminance value of FIG. 7A.

Figure 8A:
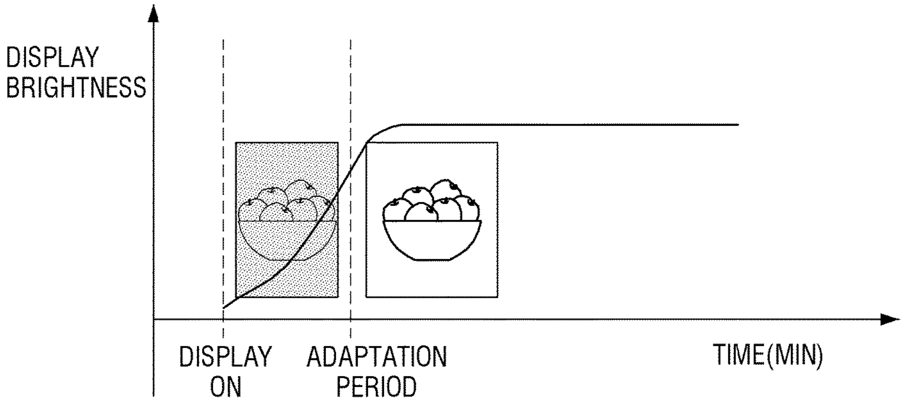
FIGS. 8A and 8B illustrate visual brightness according to various exemplary embodiments.
Figure 8B:
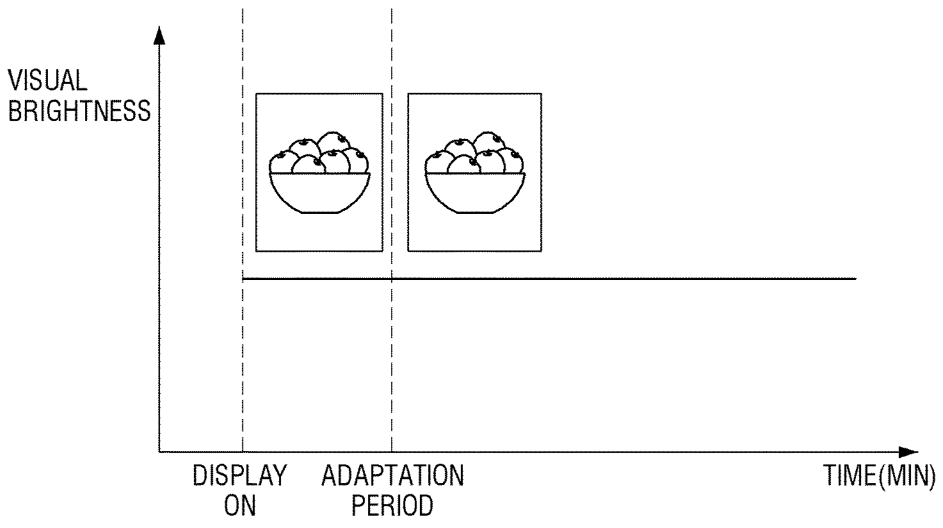

FIGS. 8A and 8B illustrated visual brightness according to an exemplary embodiment.

According to an exemplary embodiment, in response to an output luminance value of a display gradually increasing, as illustrated in FIG. 8A, visual brightness is maintained at a constant level. Thus, the glare or visual fatigue does not occur.

Figure 9:
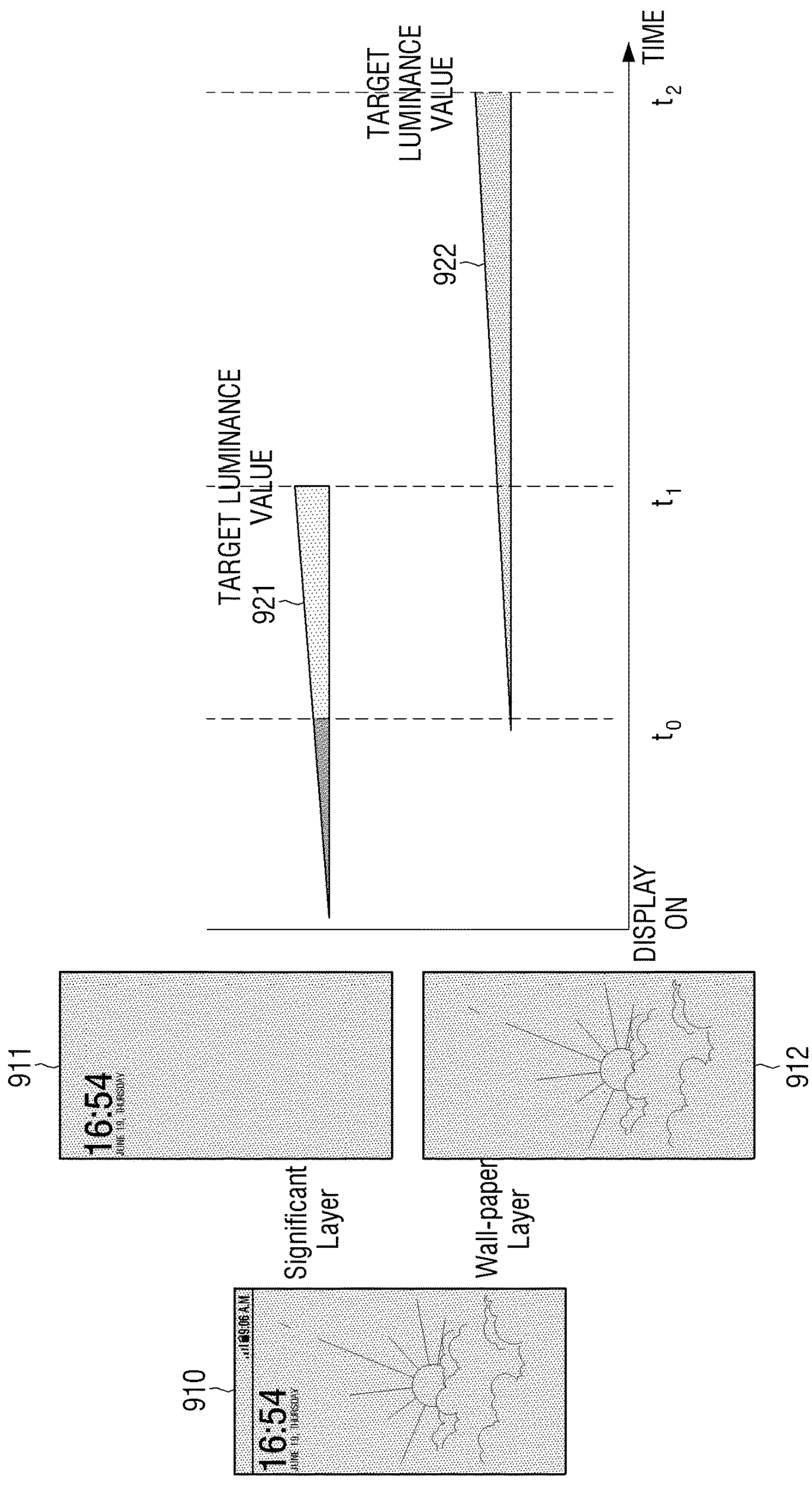
FIG. 9 illustrates a method for controlling luminance according to an exemplary embodiment.

FIG. 9 is a view illustrating a method for controlling luminance according to an exemplary embodiment.

According to an exemplary embodiment, luminance control may be performed individually for each display layer, as illustrated in FIG. 9.

In response to a displayed content 910 including a display layer 911 having information and a display layer 912 having a background, simply increasing luminance at a low speed may slow a recognition speed and cause inconvenience to a user.

In this case, the processor 130 may individually control luminance of the display layer 911 having an interested area and luminance of the display layer 912 having an uninterested area. To be specific, as illustrated, the processor 130 may increase the luminance of the display layer 911 having the information at high speed and increase the luminance of the display layer 912 having the background at low speed so that the luminance of the display layer 911 having the information reaches a target luminance value ahead of the luminance of the display layer 912 having the background.

In this case, the processor 130 may variously adjust a time when luminance increase begins, a speed at which luminance increases, an initial luminance value, and a target luminance value of each display layer. Accordingly, visibility and recognition speed of information may be enhanced.

According to an exemplary embodiment, brightening speeds of respective layers 911 and 912 may be the same. According to another exemplary embodiment, a shape of a brightening curve of each layer may be set differently. For example, when a significant layer brightens in a log form, and a wallpaper layer brightens in an exponential function form, a human may recognize the significant layer first, and then gradually recognize the wallpaper layer.

The display layer may, for example, be divided into two layers as illustrated, but the number of display layers may vary depending upon a circumstance or displayed information. Meanwhile, as described above, each area may be processed as a layer according to a local position of an image. In addition, a head-mounted display (HMD), a nano-emissive display (NED), and a projector may also process transmitted background information, a reflected medium, or a screen as one layer.

For example, in case of a lock-screen of a mobile device, when priority orders of clock information, date and day information, another notification window including a messenger and alarm, and a wallpaper are predetermined as layer 1, layer 2, layer 3, and layer 4 by a user or by a manufacturer, the processor 130 may control the respective layers to brighten sequentially based on the priority orders.

Alternatively, the processor 130 may control layer 1 and layer 2, including text with information, to brighten at the same speed, control layer 3 to brighten more slowly than layers 1 and 2, and control layer 4 to brighten after layers 1, 2 and 3.

The processor 130 may adjust the priority according to user preference. In response to a user who prefers layer 3, that is, the other notification window including a messenger and alarm, to layer 1, that includes a clock, the processor 130 may control the layer 1 and layer 3 to brighten simultaneously at a high speed, and control the other layers to brighten in a predetermined order.

In addition, when it is difficult to assign a priority order to the layers, the processor 130 may define a priority order of each layer according to the following exemplary rule, and control the layers to brighten according to speeds and curve forms corresponding to the determined order.

$$\text{Layer\_Order}=\alpha*(\text{peak\_contrast})-\beta*(\text{Average\_}Y)+\gamma*(\text{std\_dev})$$

In this case, coefficients of α, β, and γ may vary depending upon a size of a display and the ambient illuminance, and a transparent part may be regarded as Black or White according to the display apparatus.

A layer order defined by the above rule may be changed according to an element predetermined by the user preference or by the manufacturer.

Meanwhile, the processor 130 may classify and process one or more layers in a particular priority order (for example, the second position of the priority order) as a significant layer according to the priority order of each layer, a manufacturer policy, user preference, etc.

Meanwhile, a function for reducing static glare is similar to the function for reducing dynamic glare. The static glare function may operate in response to the ambient illuminance being lower than critical illuminance set by a user or by a manufacturer.

To be specific, the processor 130 may analyze a content based on various elements, such as average brightness or a maximum brightness value of the content, histogram distribution, contrast distribution, etc. In this case, an HMD, an NED, and a projector may also process transmitted background information, a reflected medium, or a screen as one layer.

The static glare reduction function may be based on illuminance. However, when there is contrast where main elements of a content may be identified in terms of visibility, the function may be used in only specific areas of gradation. That is, the processor 130 may vary some gradation or brightness and color of a content based on the elements of the content only, regardless of the illuminance.

FIGS. 10A to 10C and FIG. 11 are views illustrating a method for controlling luminance according to another exemplary embodiment.

Figure 10A:
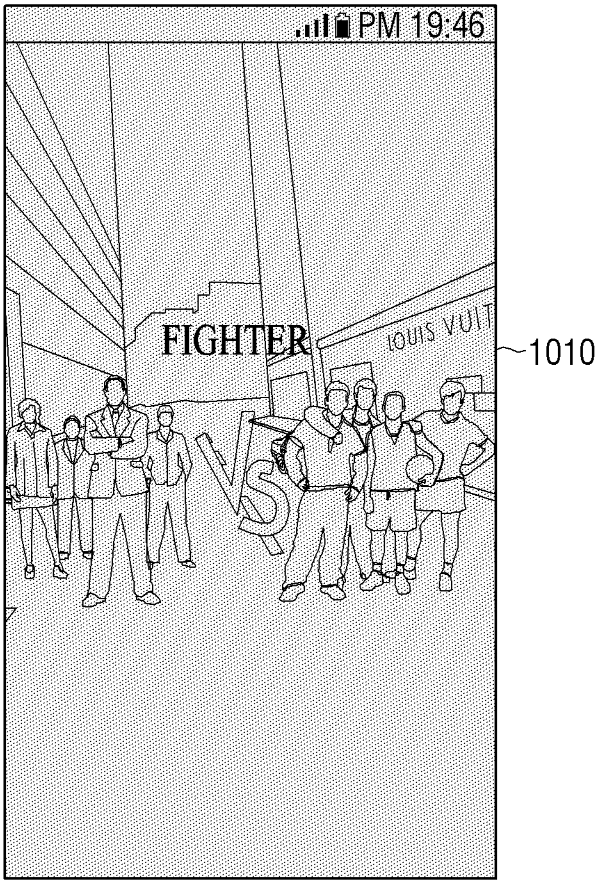
FIGS. 10A to 10C and FIG. 11 are views illustrating methods for controlling luminance according to exemplary embodiments.
Figure 10B:
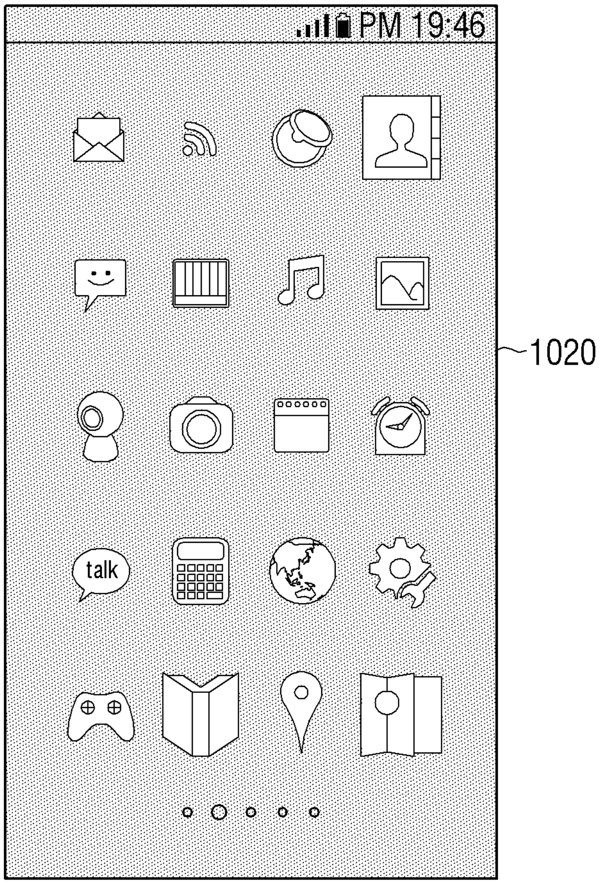
Figure 10C:
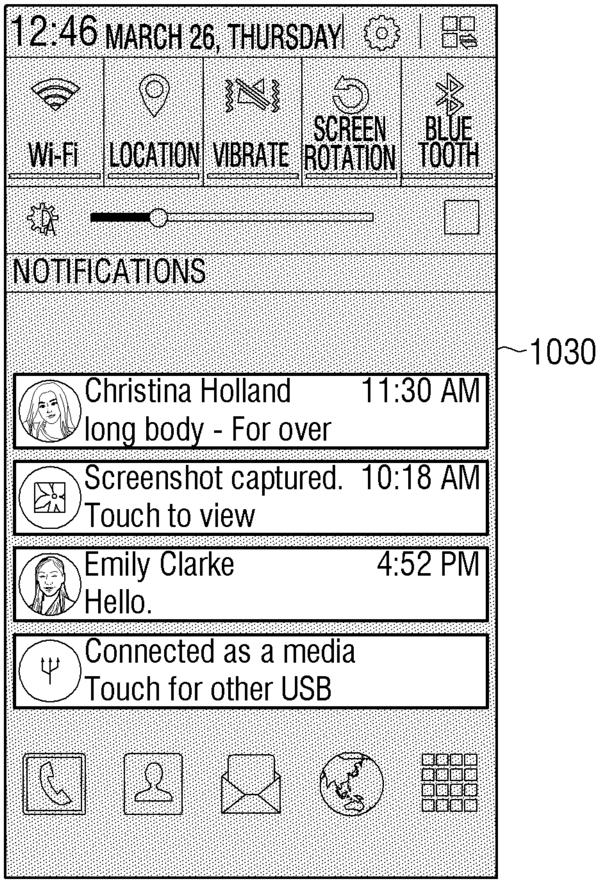

As illustrated in FIGS. 10A to 10C, the luminance control may be performed individually for each gradation section based on an attribute of a content. That is, the luminance control according to the above-described static glare reduction function may be performed.

Figure 11:
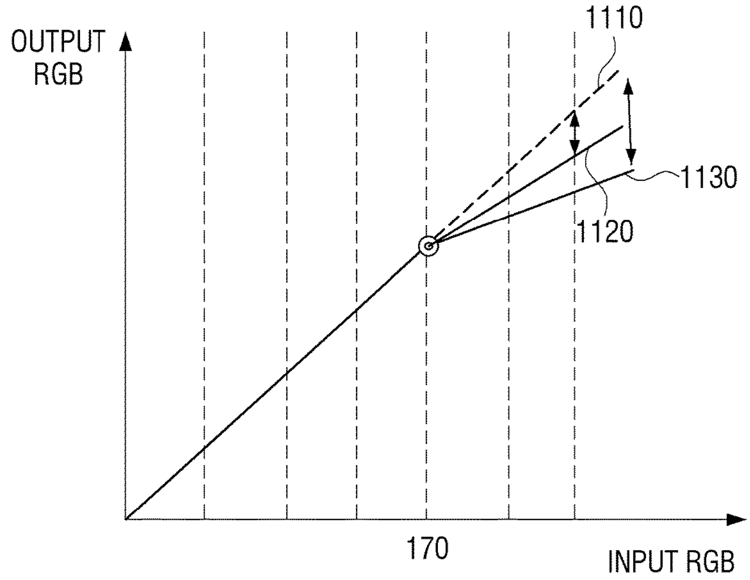

For example, as illustrated in FIG. 10A, a content 1010 having low contrast (contrast ratio) does not cause glare, and thus as represented by 1110 in FIG. 11, additional luminance control may not be performed.

In case of a content 1020 having slight contrast (contrast ratio), as illustrated in FIG. 10B, a peak luminance value of some gradation sections (for example, sections 200 to 255 having high gradation) may be adjusted to be slightly lowered (for example, 10%) as represented by 1120 in FIG. 11.

In addition, in case of a content 1030 having high contrast (contrast ratio), as illustrated in FIG. 10C, the peak luminance value of some gradation sections (for example, the sections 200 to 255 having high gradation) may be adjusted to be considerably lowered (for example, 30%), as represented by 1130 in FIG. 11.

Figure 12A:
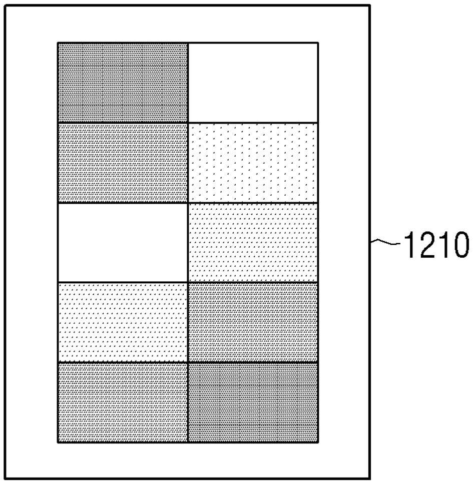
FIGS. 12A and 12B are views illustrating a method for controlling luminance according to still another exemplary embodiment.
Figure 12B:
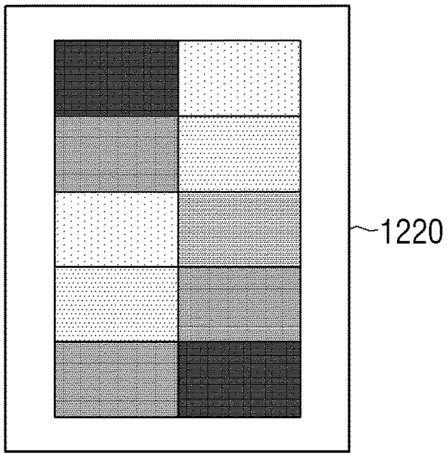

FIGS. 12A and 12B are views illustrating a method for controlling luminance according to still another exemplary embodiment of the present disclosure.

In case of a content 1210 having high contrast as illustrated in FIG. 12A, visibility enhancement and power reduction may be achieved by lowering an output luminance value of a high gradation section, as illustrated in displayed content 1220 of FIG. 12B. For example, it is assumed that high power is consumed when luminance corresponding to a white gradation value of an original copy illustrated in FIG. 12 is output. In this case, as illustrated in FIG. 12B, it may be understood that the consumed power is reduced when the luminance corresponding to the white gradation value is lowered to, for example approximately 68%, as illustrated in FIG. 12B, may enhance visibility and reduce power consumption.

Figure 13:
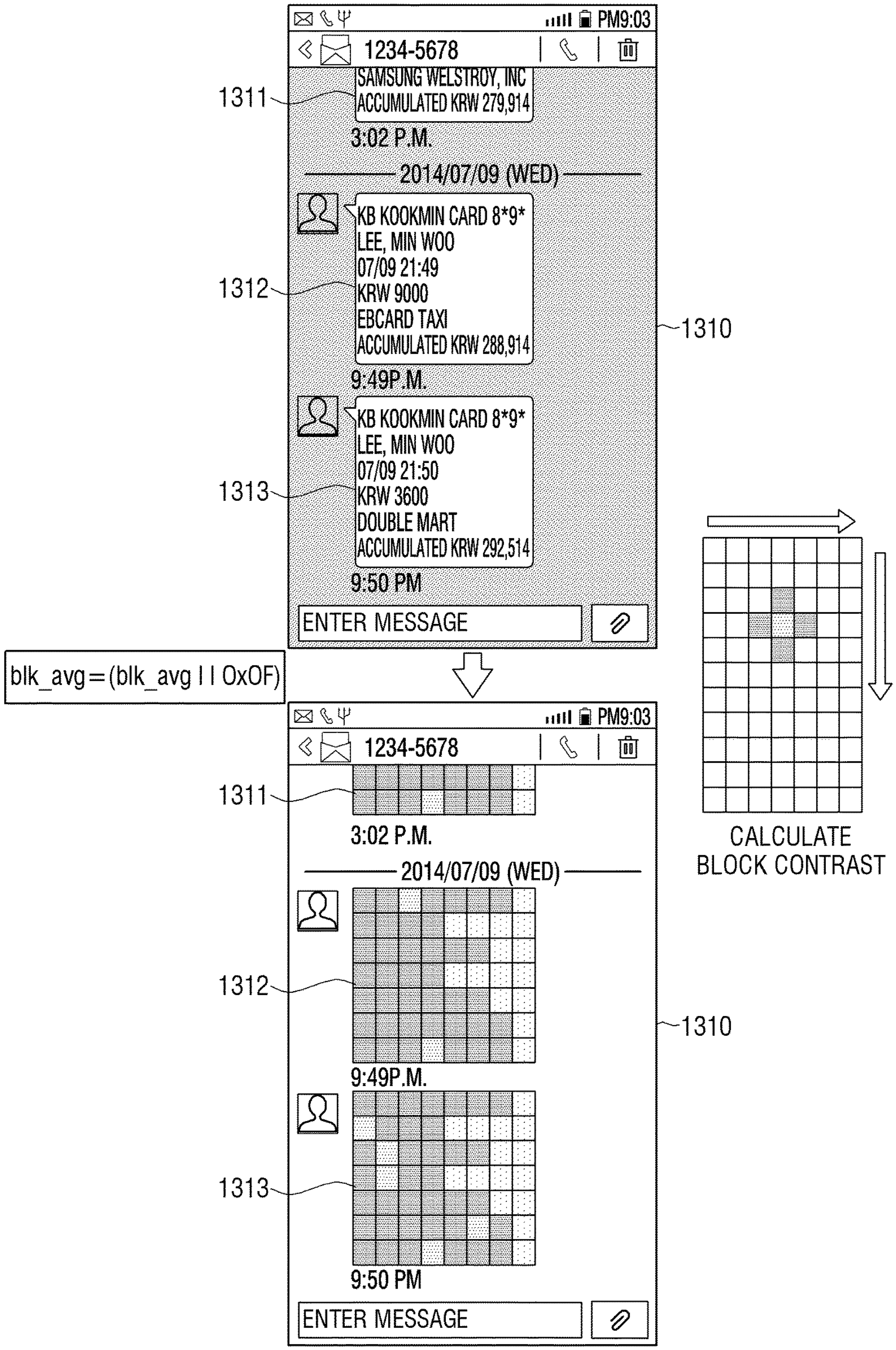
FIG. 13 is a view illustrating a method for determining a content attribute according to an exemplary embodiment.

FIG. 13 is a view illustrating a method for determining a content attribute according to an exemplary embodiment.

As illustrated in FIG. 13, attributes, such as contrast, overall brightness, local contrast, a color, etc., may be considered in order to determine a subject of luminance control from among contents displayed on display 1310. In this case, a weighted value of each attribute may be determined according to an ambient environment or a device purpose.

For example, influence level of each content element 1311, 1312 and 1313 may be obtained based on the following expression, and a subject to be controlled may be determined accordingly:

$$\text{content element influence level} = \left(A \times \log\left(\frac{\text{front-view area}}{\text{whole area}}\right) - B(\text{contrast})\right) \times \text{Pr\_w}$$

In this case, Pr_w represents relative variation of pupils of eyes for each color.

Figure 14:
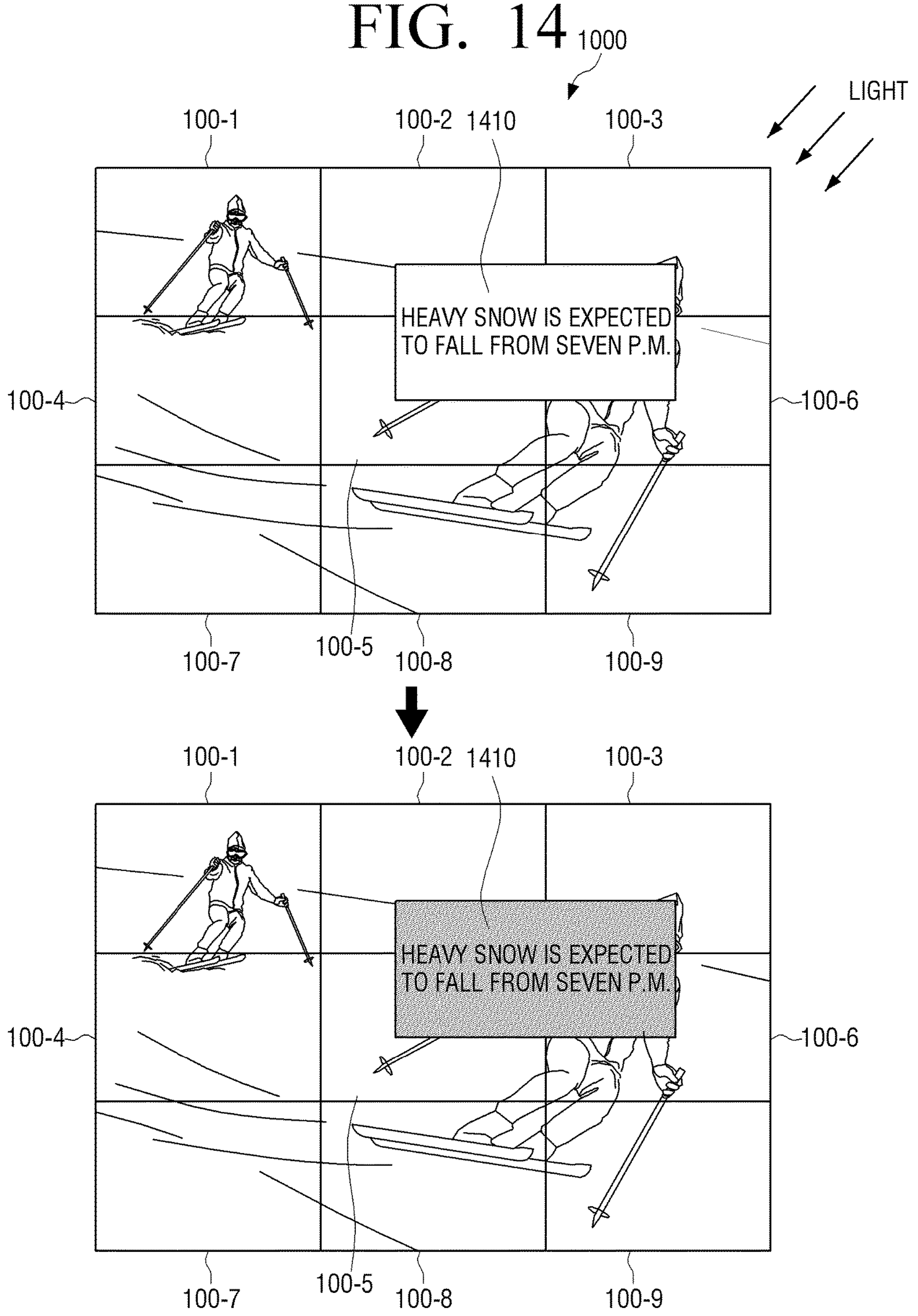
FIG. 14 is a view illustrating a method for controlling luminance according to an exemplary embodiment.

FIG. 14 is a view illustrating a method for controlling luminance according to an exemplary embodiment.

FIG. 14 illustrates an example in which the display apparatus 100 is realized as a video wall system. As illustrated, luminance of a certain object that is a subject of luminance control may be controlled individually in the video wall system.

To be specific, when visibility of important information 1410 is weak according to the ambient illuminance, luminance of some display panels 100-2, 100-3, 100-5, 100-6 which provide the information among entire display panels 100-1 to 100-9 may be adjusted individually in order to enhance the visibility of the information 1410. For example, in response to very high ambient illuminance, luminance of an area in which the important information 1410 is displayed may be lowered in order to enhance the visibility.

In this case, the luminance adjustment for a display layer including the information may be performed individually in the display panels 100-2, 100-3, 100-5, 100-6, which correspond to the area in which the information 1410 is displayed. Alternatively, in response to each of the display panels 100-2, 100-3, 100-5, 100-6 being realized as a spontaneous emission element which emits a light spontaneously by a pixel unit, the luminance adjustment may be performed with respect to only the area in which the information 1410 is displayed.

FIGS. 15A, 15B, 16A, and 16B are views illustrating a method for controlling luminance according to another exemplary embodiment.

FIGS. 15A, 15B, 16A, and 16B illustrate an example in which the display apparatus 100 is realized as a transparent display. As illustrated, luminance of a certain object that is a subject of the luminance adjustment may be controlled individually in the transparent display.

Figure 15A:
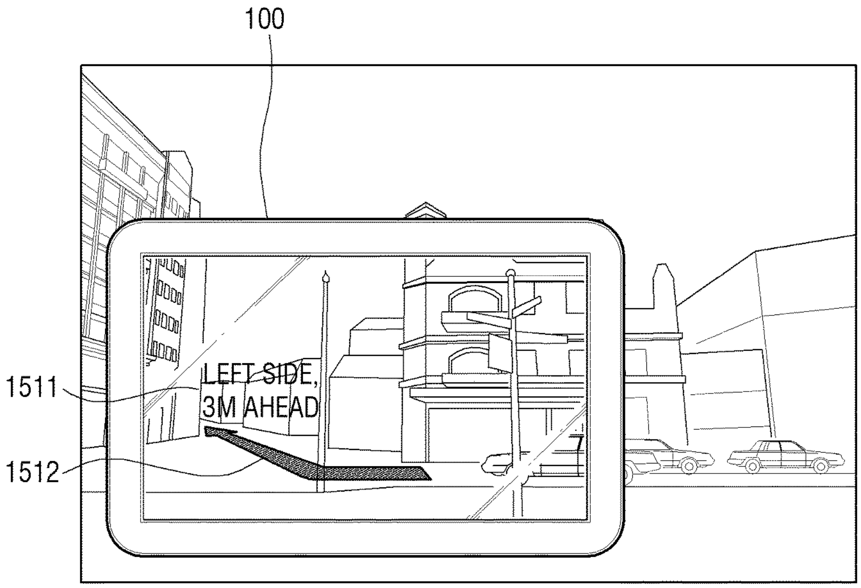
FIGS. 15A, 15B, 16A, and 16B are views illustrating methods for controlling luminance according to exemplary embodiments.
Figure 15B:
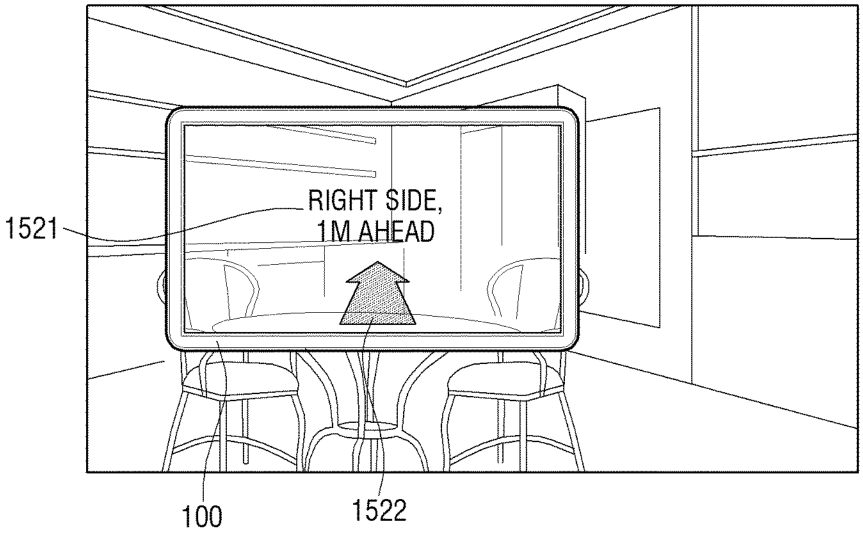

As an example, in response to the display apparatus 100 having a transparent display being used as a navigator as illustrated in FIGS. 15A and 15B, an augmented reality (AR) object for directions may be displayed. According to an exemplary embodiment, luminance of the AR object may be adjusted according to the ambient illuminance.

In this case, as illustrated in FIG. 15A, AR objects 1511, 1512 for directions may be provided at low luminance in an outdoor environment where illuminance is high. In addition, as illustrated in FIG. 15B, AR objects 1521, 1522 for directions may be provided at high luminance in an indoor environment where illuminance is low.

Figure 16A:
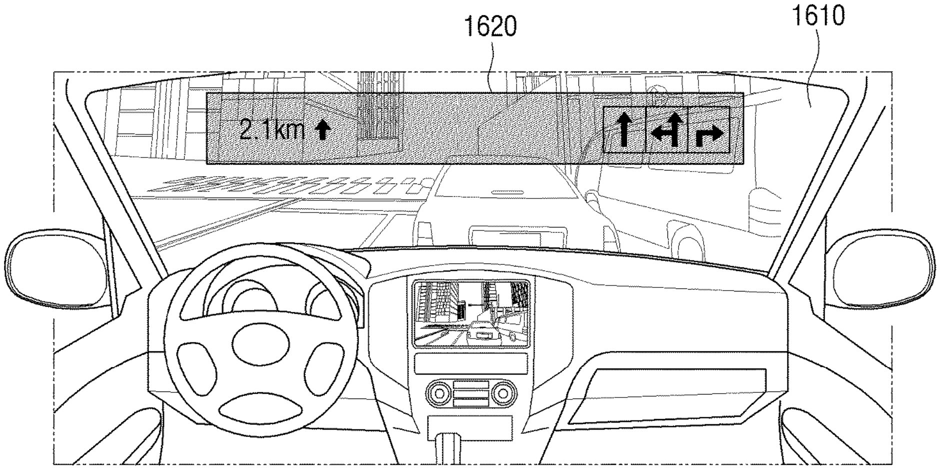
Figure 16B:
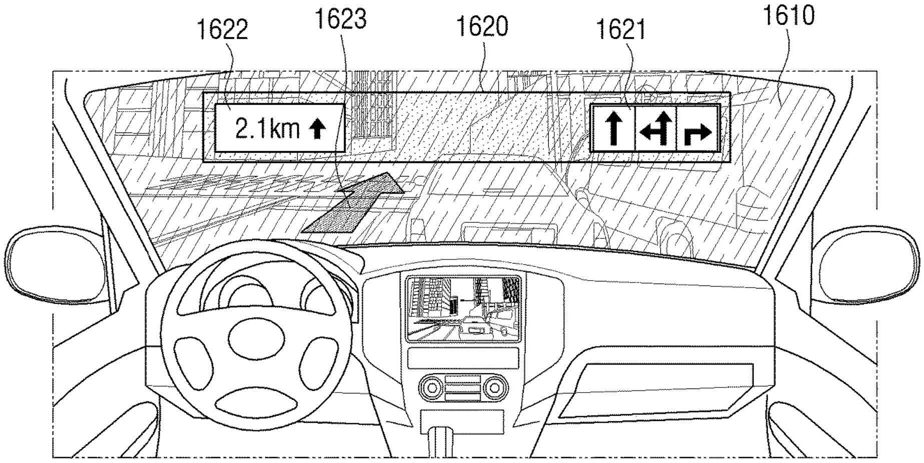

As another example, in response to a transparent display being mounted on a front window of a vehicle as illustrated in FIGS. 16A and 16B, an AR object 1620 for driving navigation may be displayed in a transparent display 1610 in a front side of the vehicle. According to an exemplary embodiment, luminance of an AR object may be adjusted according to the ambient illuminance.

In this case, in response to high ambient illuminance due to sunny weather as illustrated in FIG. 16A, the AR object 1620 for driving navigation may be provided at low luminance. In addition, in response to a dark sky and rainy weather as illustrated in FIG. 16B, the AR object 1620 for driving navigation may be provided at high luminance. Specifically, luminance of important information 1621, 1622 included in the AR object 1620 may be adjusted independently from luminance of other areas. In addition, as illustrated, an AR object 1623, such as an outline of a road, may be additionally provided according to the ambient illuminance.

Figure 17:
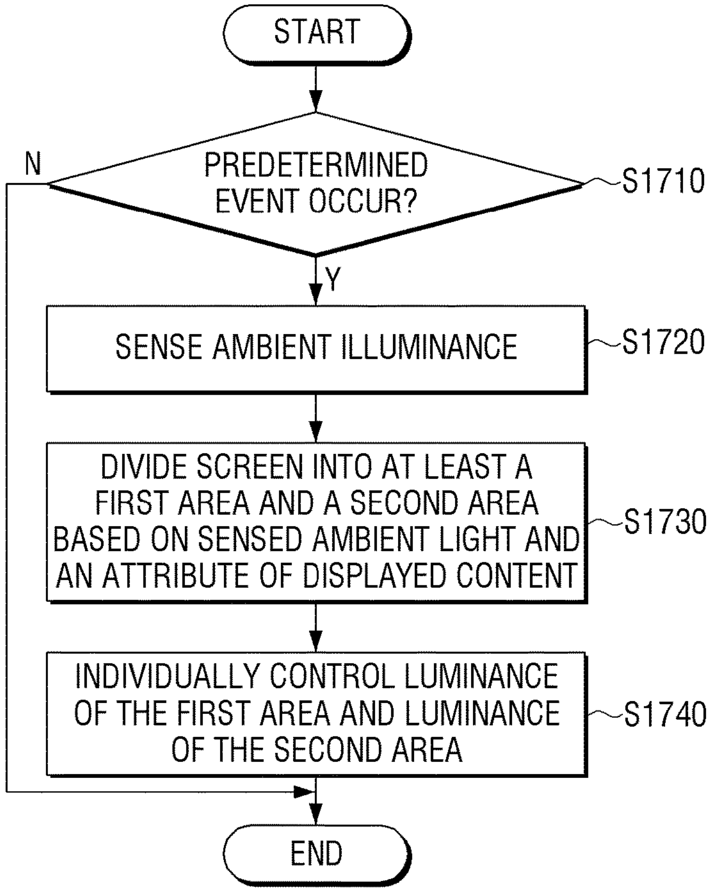
FIG. 17 is a flowchart illustrating a method for controlling a display apparatus according to an exemplary embodiment.

FIG. 17 is a flowchart illustrating a method for controlling a display apparatus according to an exemplary embodiment.

As shown in FIG. 17, in response to a predetermined event occurring in operation S1710:Y, ambient illuminance is sensed in operation S1720. In this case, the predetermined event may be an event in which a state of a screen of a display is converted from an inactive state to an active state, but is not limited thereto.

In response to the sensed ambient illuminance satisfying a predetermined condition, the screen is divided into at least a first area and a second area based on an attribute of a content in operation S1730.

Subsequently, luminance of each divided areas is individually controlled in operation S1740.

In operation S1740, output luminance of each area may be controlled individually so that luminance of information displayed in the first area is different from luminance of information displayed in the second area.

In this case, in operation S1730, in response to an event in which the ambient illuminance is rapidly changed by an amount greater than a predetermined critical value, the screen may be divided into at least a first area and a second area.

In operation S1730, in response to at least one of an event in which the screen is converted from a dark screen to a bright screen while the ambient illuminance is lower than certain illuminance, and an event in which a state of the screen is converted from an inactive state to an active state while the ambient illuminance is lower than a certain illuminance, the screen may be divided into at least a first area and a second area.

In operations S1730 and S1740, the screen may be divided into an interested area and an uninterested area based on an attribute of a content, and output luminance of the interested area and the uninterested area may be controlled individually.

In operations S1730 and 1740, in response to a state of the screen being converted from an inactive state to an active state and the ambient illuminance being lower than predetermined critical illuminance, output luminance of the interested area and the uninterested area may be controlled individually so that the output luminance of the interested area reaches a target luminance value before the output luminance of the uninterested area reaches a target luminance value.

In operations S1730 and S1740, in response to the ambient illuminance being lower than a predetermined critical luminance, each area may be controlled individually so that the output luminance of the uninterested area becomes lower than the output luminance of the interested area, thereby reducing glare.

In operations S1730 and S1740, in response to the ambient illuminance being higher than a predetermined critical luminance, each area may be controlled individually so that the output luminance of the interested area becomes lower than the output luminance of the uninterested area, thereby increasing visibility of the interested area.

In operations S1730 and S1740, output luminance of a first display layer having at least a first area and output luminance of a second display layer having a second area may be controlled individually.

In operations S1730 and S1740, a gradation section of a content may be divided into a gradation section satisfying a predetermined condition and another gradation section based on the attribute of the content, and output luminance of each of the gradation sections may be controlled individually.

In addition, in operations S1730 and S1740, in response to high contrast of the content, output luminance of a gradation section higher than a predetermined critical value may be reduced.

Figure 18:
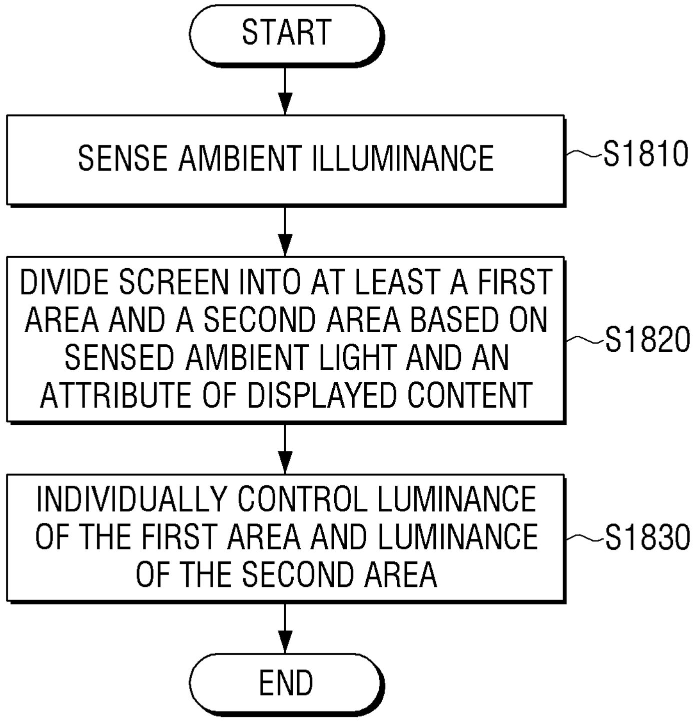
FIG. 18 is a flowchart illustrating a method for controlling a display apparatus according to another exemplary embodiment.
Figure 19:
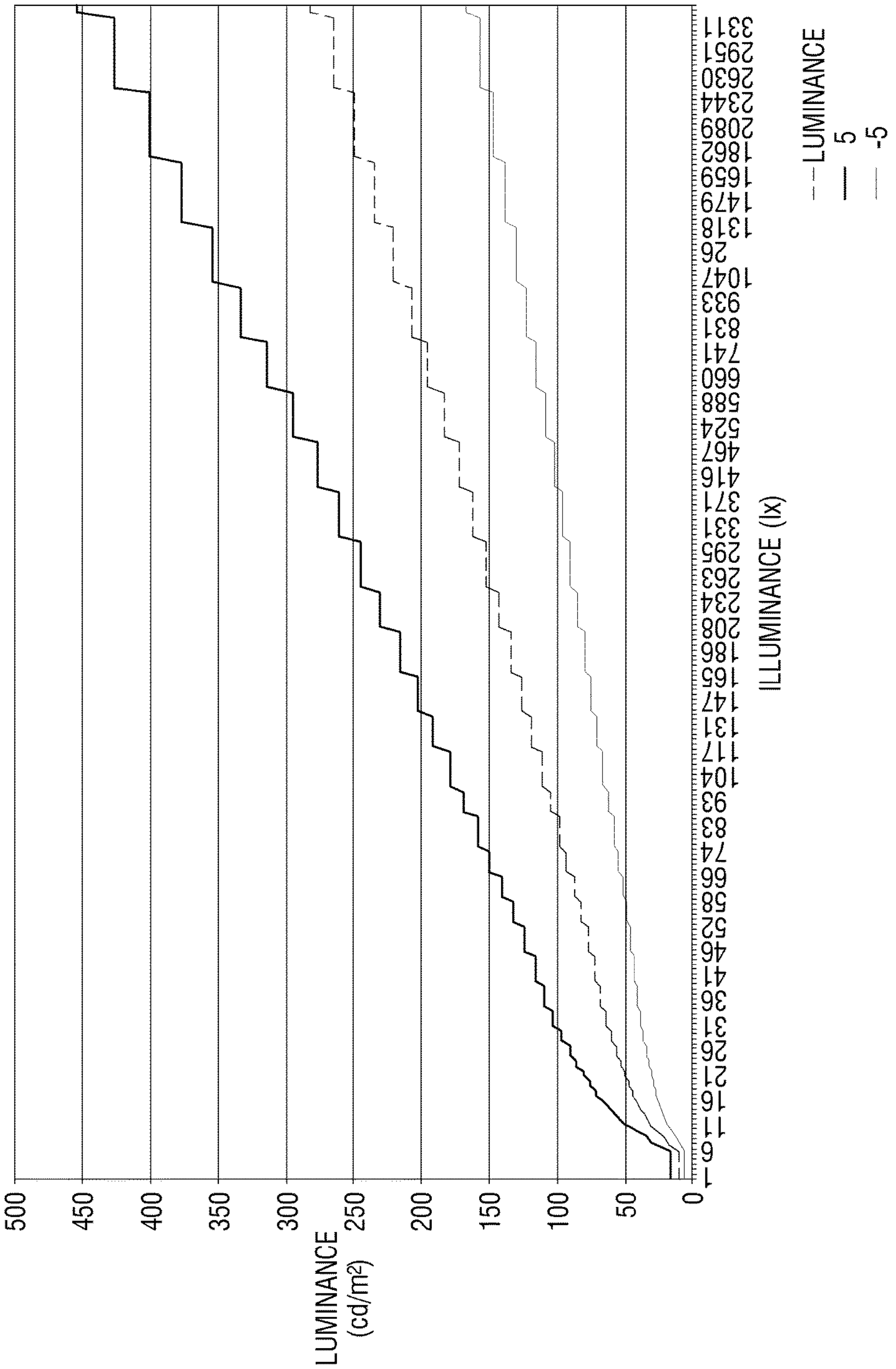
FIG. 19 is a view illustrating a method for controlling luminance.

FIG. 18 is a flowchart illustrating a method for controlling a display apparatus according to another exemplary embodiment.

As shown in FIG. 18, ambient illuminance is sensed in operation S1810. In this case, the display apparatus may sense the ambient illuminance periodically or in response to a predetermined event (for example, events according to change of location or a predetermined time). For example, the display apparatus may sense the ambient illuminance periodically after 9 p.m.

A screen is divided into at least a first area and a second area based on the sensed ambient illuminance and an attribute of a content in operation S1820.

Subsequently, luminance of each of the divided areas is controlled individually in operation S1830.

To be specific, in operation S1830 in which the luminance of each of the divided areas is controlled individually, the luminance of each of the divided area may be controlled individually based on an attribute of an object displayed in each area. For example, as illustrated in FIG. 17, luminance of a screen may be adjusted in real time based on the ambient illuminance and an attribute of a content, even though an event in which a state of the screen is converted from an inactive state to an active state does not occur.

According to aspects of the above-described exemplary embodiments, when a display apparatus is used at nighttime or in a dark environment, visual characteristics may be adjusted according to the ambient illuminance and a content attribute.

Meanwhile, the methods consistent with various exemplary embodiments may be programmed and stored in diverse storage mediums, such as a non-transitory computer readable storage medium. Accordingly, the methods may be implemented in various types of electronic apparatuses which execute the programming stored in such storage mediums.

The non-transitory computer readable medium refers to a medium which may store data permanently or semi-permanently, and may be readable by an apparatus. To be specific, the above-described various applications and programs may be stored in and provided through non-transitory computer readable medium, such as a compact disc (CD), digital versatile disc (DVD), hard disk, Blu-ray disk, universal serial bus storage (USB), memory card, read-only memory (ROM), etc.

The foregoing exemplary embodiments and advantages are merely exemplary and are not to be construed as limiting. The present can be readily applied to other types of devices. Also, the description of exemplary embodiments is intended to be illustrative, and not to limit the scope of the claims, and many alternatives, modifications, and variations will be apparent to those skilled in the art.

What is claimed is:

1. A display apparatus comprising:

a display;

a sensor; and a processor configured to:

control the display to display, identify, based on ambient light sensed by the sensor satisfying a predetermined condition, at least a first area and a second area of a content based on an attribute of the content, identify a priority order of the first area and the second area, the priority order being information regarding an order of an output luminance to reach a target luminance, identify an interested area and an uninterested area among the first area and the second area based on the priority order, and individually control a first output luminance of the interested area and a second output luminance of the uninterested area, wherein the processor is configured to control the first output luminance to reach a first target luminance before the second output luminance reaches a second target luminance based on a first luminance varying time of the first output luminance and a second luminance varying time of the second output luminance.

2. The apparatus as claimed in claim 1, wherein the first output luminance is different than the second output luminance.

3. The apparatus as claimed in claim 1, wherein the processor is further configured to divide the content into the first area and the second area based on at least one among the ambient light satisfying the predetermined condition, an event in which the ambient light changes rapidly by an amount greater than a predetermined critical value, an event in which the display is converted from a dark screen to a bright screen while the ambient light is lower than a certain luminance, and an event in which a state of the display is converted from an inactive state to an active state while the ambient light is lower than the certain luminance.

4. The apparatus as claimed in claim 1, wherein the first area corresponds to the interested area and the second area corresponds to the uninterested area, wherein the first area and the second area are identified based on the attribute of the content.

5. The apparatus as claimed in claim 4, wherein the processor is further configured to, based on a state of the display being converted from an inactive state to an active state and the ambient light being lower than a predetermined critical luminance, control the first output luminance to reach the first target luminance before the second output luminance reaches the second target luminance.

6. The apparatus as claimed in claim 4, wherein the processor is further configured to, based on the ambient light being lower than a predetermined critical luminance, control the second output luminance to be lower than the first output luminance.

7. The apparatus as claimed in claim 4, wherein the processor is further configured to, based on the ambient light being higher than a predetermined critical luminance, control the first output luminance to be lower than the second output luminance.

8. The apparatus as claimed in claim 1, wherein the first area is on a first display layer and the second area is on a second display layer.

9. The apparatus as claimed in claim 1, wherein the processor is further configured to identify the first area by identifying a gradation section corresponding to a predetermined gradation condition.

10. The apparatus as claimed in claim 9, wherein the processor is further configured to, based on the attribute of the content indicating high contrast, reduce the first output luminance, and wherein the predetermined gradation condition comprises a gradation higher than a predetermined critical value.

11. A method for controlling a display apparatus, the method comprising:

identifying whether ambient light satisfies a predetermined condition;

identifying, based on the ambient light satisfying the predetermined condition, at least a first area and a second area of a display content based on an attribute of the display content;

identifying a priority order of the first area and the second area, the priority order being information regarding an order of an output luminance to reach a target luminance;

identifying an interested area and an uninterested area among the first area and the second area based on the priority order, individually controlling a first output luminance of the interested area and a second output luminance of the uninterested area; and displaying the interested area at the first output luminance and the uninterested area at the second output luminance, wherein the controlling comprises controlling the first output luminance to reach a first target luminance before the second output luminance reaches a second target luminance based on a first luminance varying time of the first output luminance and a second luminance varying time of the second output luminance.

12. The method as claimed in claim 11, wherein the individually controlling comprises individually controlling the first output luminance to be different from the second output luminance.

13. The method as claimed in claim 11, wherein the dividing is performed based on at least one among the ambient light satisfying the predetermined condition, an event in which the ambient light changes rapidly by an amount greater than a predetermined critical value, an event in which a state of the display apparatus is converted from a dark screen to a bright screen while the ambient light is lower than a certain luminance, and an event in which the state of the display apparatus is converted from an inactive state to an active state while the ambient light is lower than the certain luminance.

14. The method as claimed in claim 11, wherein the first area corresponds to the interested area and the second area corresponds to the uninterested area, wherein the first area and the second area are identified based on the attribute of the display content.

15. A method of displaying content comprising:

analyzing display content to identify a first area of a display content comprising a first luminance and a second area of the display content comprising a second luminance;

sensing an ambient light level;

comparing the sensed ambient light level to a threshold ambient light level;

modifying the first luminance and the second luminance based on the comparing;

identifying a priority order of the modified first luminance and the modified second luminance, the priority order being information regarding an order of an output luminance to reach a target luminance;

identifying an interested area and an uninterested area among the modified first luminance and the modified second luminance based on the priority order; and displaying the display content of the interested area at the modified first luminance and the uninterested area at the modified second luminance, wherein the modifying comprises controlling the modified first luminance to reach a first target luminance before the modified second luminance reaches a second target luminance based on a first luminance varying time of the modified first luminance and a second luminance varying time of the modified second luminance.

16. The method as claimed in claim 15, wherein based on the sensed ambient light level being less than the threshold ambient light level, the modified first luminance is greater than the first luminance.

17. The method as claimed in claim 16, wherein the modified second luminance is less than the second luminance.

18. The method as claimed in claim 15, wherein based on the sensed ambient light level being greater than the threshold ambient light level, the modified first luminance is less than the first luminance.

* * * * *